United States Patent
Kim et al.

(10) Patent No.: US 9,731,717 B2
(45) Date of Patent: Aug. 15, 2017

(54) DRIVER ASSISTANCE APPARATUS AND METHOD FOR OPERATING THE SAME

(71) Applicant: Hyundai Motor Company, Seoul (KR)

(72) Inventors: Eung Seo Kim, Gyeonggi-do (KR); Dong Hyun Sung, Seoul (KR); Sang Min Lee, Seoul (KR); Suk Ki Min, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/716,474

(22) Filed: May 19, 2015

(65) Prior Publication Data

US 2016/0114798 A1    Apr. 28, 2016

(30) Foreign Application Priority Data

Oct. 27, 2014    (KR) .................. 10-2014-0146195

(51) Int. Cl.
*B60W 30/09*    (2012.01)
*B60W 10/18*    (2012.01)
(Continued)

(52) U.S. Cl.
CPC ............ *B60W 30/09* (2013.01); *B60W 10/18* (2013.01); *B60W 10/20* (2013.01); *B60W 30/00* (2013.01); *B60W 30/095* (2013.01); *B60W 30/0956* (2013.01); *B60W 40/114* (2013.01); *G01S 13/862* (2013.01); *G01S 13/865* (2013.01); *G01S 13/867* (2013.01); *G01S 13/931* (2013.01); *G01S 15/025* (2013.01); *G01S 15/931* (2013.01); *G01S 17/023* (2013.01);
(Continued)

(58) Field of Classification Search
CPC .............. B60W 30/09; B60W 30/095; B60W 30/0953; B60W 30/0956
See application file for complete search history.

(56) References Cited

U.S. PATENT DOCUMENTS 5,479,173 A * 12/1995 Yoshioka .................. B60T 7/22
                                                        342/70
6,037,860 A *  3/2000 Zander .................. B60W 30/09
                                                        307/10.1
(Continued)

FOREIGN PATENT DOCUMENTS

DE    102010029465 A1 * 12/2011
DE    102010053350 A1 *  6/2012
(Continued)

OTHER PUBLICATIONS

JPO machine translation of JP 10-69598 (original JP document published Mar. 10, 1998).*

(Continued)

*Primary Examiner* — Behrang Badii
*Assistant Examiner* — David Testardi
(74) *Attorney, Agent, or Firm* — Mintz Levin Cohn Ferris Glovsky and Popeo, P.C.; Peter F. Corless

(57) ABSTRACT

A method for operating a driver assistance apparatus includes: recognizing a driving environment of a vehicle; determining a driving mode based on the driving environment; determining whether the vehicle is driven using at least one sensor based on the driving mode; and controlling steering and braking of the vehicle based on whether the vehicle is driven using the at least one sensor.

10 Claims, 6 Drawing Sheets

(51) Int. Cl.
| | |
|---|---|
| *B60W 10/20* | (2006.01) |
| *B60W 30/00* | (2006.01) |
| *B60W 30/095* | (2012.01) |
| *B60W 40/114* | (2012.01) |
| *G01S 15/93* | (2006.01) |
| *G01S 17/02* | (2006.01) |
| *G01S 17/93* | (2006.01) |
| *G01S 15/02* | (2006.01) |
| *G01S 13/93* | (2006.01) |
| *G01S 13/86* | (2006.01) |

(52) U.S. Cl.
CPC ........ *G01S 17/936* (2013.01); *B60W 2710/18* (2013.01); *B60W 2710/20* (2013.01); *G01S 13/86* (2013.01); *G01S 2013/9353* (2013.01); *G01S 2013/9364* (2013.01); *G01S 2013/9367* (2013.01); *G01S 2013/9375* (2013.01); *G01S 2015/938* (2013.01)

(56) References Cited

U.S. PATENT DOCUMENTS

| | | | | |
|---|---|---|---|---|
| 6,498,972 | B1* | 12/2002 | Rao | B60Q 1/38 701/301 |
| 6,642,839 | B1* | 11/2003 | Gunderson | G01S 13/931 340/435 |
| 7,375,620 | B2* | 5/2008 | Balbale | B60Q 9/004 340/435 |
| 2003/0167113 | A1* | 9/2003 | Weilkes | B60K 31/0008 701/45 |
| 2003/0201929 | A1* | 10/2003 | Lutter | G01S 7/032 342/52 |
| 2004/0090117 | A1* | 5/2004 | Dudeck | B60T 7/22 303/191 |
| 2005/0040983 | A1* | 2/2005 | Madau | B60K 31/0008 342/70 |
| 2005/0125155 | A1* | 6/2005 | Kudo | B62D 15/0265 701/301 |
| 2007/0032952 | A1* | 2/2007 | Carlstedt | B60R 21/0134 701/301 |
| 2008/0059069 | A1* | 3/2008 | Trutna | G08G 1/166 701/301 |
| 2008/0188996 | A1* | 8/2008 | Lucas | B60T 8/174 701/1 |
| 2008/0312833 | A1* | 12/2008 | Greene | G06K 9/00805 701/301 |
| 2008/0319610 | A1* | 12/2008 | Oechsle | B60R 21/0134 701/41 |
| 2009/0099728 | A1* | 4/2009 | Ichinose | B62D 15/0265 701/39 |
| 2009/0138201 | A1* | 5/2009 | Eckstein | B60R 21/013 701/301 |
| 2009/0299593 | A1* | 12/2009 | Borchers | B60W 10/184 701/70 |
| 2010/0030474 | A1* | 2/2010 | Sawada | G08G 1/163 701/301 |
| 2011/0015818 | A1* | 1/2011 | Breuer | B60T 8/17558 701/31.4 |
| 2011/0071731 | A1* | 3/2011 | Eidehall | G01S 7/295 701/42 |
| 2012/0035846 | A1* | 2/2012 | Sakamoto | B60T 8/17558 701/301 |
| 2012/0101701 | A1* | 4/2012 | Moshchuk | B60W 10/184 701/70 |
| 2012/0163671 | A1 | 6/2012 | Choi et al. | |
| 2012/0191313 | A1* | 7/2012 | Miyahara | B60K 28/14 701/70 |
| 2013/0024075 | A1* | 1/2013 | Zagorski | G08G 1/166 701/46 |
| 2013/0124041 | A1* | 5/2013 | Belser | B60W 30/095 701/41 |
| 2013/0338877 | A1 | 12/2013 | Straus | |
| 2014/0316668 | A1* | 10/2014 | Akiyama | B60W 10/184 701/70 |
| 2015/0019119 | A1 | 1/2015 | Shin | |
| 2015/0210311 | A1* | 7/2015 | Maurer | B60W 30/09 701/41 |
| 2015/0302751 | A1* | 10/2015 | Strauss | B60T 7/22 701/41 |
| 2016/0125738 | A1* | 5/2016 | Rosen | G08G 1/166 701/70 |

FOREIGN PATENT DOCUMENTS

| | | | |
|---|---|---|---|
| DE | 102013103626 A1 * | 6/2014 | |
| FR | 2887669 A3 * | 12/2006 | ............ B60Q 1/525 |
| JP | 09011870 A * | 1/1997 | |
| JP | H09-106500 A | 4/1997 | |
| JP | 10069598 A * | 3/1998 | |
| JP | H10-283592 A | 10/1998 | |
| JP | H11-16097 A | 1/1999 | |
| JP | 2002059820 A * | 2/2002 | |
| JP | 2003006620 A * | 1/2003 | |
| JP | 2004-161096 A | 6/2004 | |
| JP | 2005-247307 A | 9/2005 | |
| JP | 2008-062666 A | 3/2008 | |
| KR | 20-1998-0052278 U | 10/1998 | |
| KR | 10-2007-0060539 A | 6/2007 | |
| KR | 10-2012-0036440 A | 4/2012 | |
| KR | 10-2012-0072131 A | 7/2012 | |
| KR | 10-2012-0140545 A | 12/2012 | |
| KR | 2014-0003449 A | 1/2014 | |
| KR | 10-1417659 B1 | 7/2014 | |

OTHER PUBLICATIONS

EPO machine translation of DE 102010029465 (original DE document published Dec. 1, 2011).*

JPO machine translation of JP 2002-059820 (original JP document published Feb. 26, 2002).*

* cited by examiner

<SPIRAL PARKING LOT RAMP>

<DRIVE ALLEY AND INTER-VEHICLE NARROW ROAD>

DRIVER ASSISTANCE APPARATUS AND METHOD FOR OPERATING THE SAME

CROSS-REFERENCE TO RELATED APPLICATION

This application claims priority to and the benefit of Korean Patent Application No. 10-2014-0146195, filed on Oct. 27, 2014 in the Korean Intellectual Property Office, the disclosure of which is incorporated herein in its entirety by reference.

TECHNICAL FIELD

The present disclosure relates generally to a driver assistance apparatus and a method for operating the same, and more particularly, to a driver assistance apparatus capable of controlling steering and/or braking of a vehicle and a method for operating the same.

BACKGROUND

An advanced driver assistance system (ADAS) may provide driver driving information or activate a risk alarm enabling the driver to more conveniently and safely drive a vehicle, while also allowing a driver to proactively intervene in order to prevent an accident. A typical ADAS uses a camera, a radar, a LiDAR, and the like to recognize environment and obstacles around the vehicle.

In addition to the ADAS, other assistance systems exist, such as autonomous emergency braking (AEB), a smart cruise control (SCC), a lane departure warning system (LDWS), and the like. In particular, the AEB system recognizes vehicles or pedestrians in front of a vehicle while driving to automatically perform braking before colliding therewith so as to avoid a collision or reduce collision damage. However, the existing driver assistance systems are not operated at speeds under 10 km/h and do not recognize proximity distance obstacles from the front and sides of a vehicle due to a limitation of short-range field of view (FOV) and radar reflection characteristics. Therefore, according to conventional techniques, accidents frequently occur at areas such as a spiral parking lot ramp, a narrow road, an alley, etc., as well as accidents involving pedestrians in densely populated areas.

Furthermore, conventional systems have a reduced camera recognition rate in low-light level areas, such as a parking lot. Therefore, such systems have difficulty in recognizing obstacles using the camera. Even further, the conventional systems may have trouble avoiding lateral obstacles and may not identify positions of pedestrians within/out of a vehicle width of a vehicle driving direction. Therefore, such systems may not be able to determine whether there is collision possibility.

SUMMARY

The present disclosure has been made to solve the above-mentioned problems occurring in the related art while advantages achieved by the related art are maintained intact.

An aspect of the present disclosure provides a driver assistance apparatus and a method for operating the same capable of preventing accidents involving proximity distance obstacles by controlling steering and braking in a vertical and horizontal direction, especially in a low-speed section, using a camera, a radar, and an ultrasonic sensor fusion. Another aspect of the present disclosure provides a driver assistance apparatus and a method for operating the same capable of controlling steering and braking of a vehicle depending on a collision possibility with pedestrians by measuring positions of pedestrians in a densely populated district.

According to embodiments of the present disclosure, a method for operating a driver assistance apparatus includes: recognizing a driving environment of a vehicle; determining a driving mode based on the driving environment; determining whether the vehicle is driven using at least one sensor based on the driving mode; and controlling steering and braking of the vehicle based on whether the vehicle is driven using the at least one sensor.

The determining of the driving mode may include determining the driving mode based on a vehicle speed, a pedestrian density, and surrounding environment information.

The driving mode may be a minor accident prevention mode or a pedestrian protection mode.

The determining of whether the vehicle is driven using the at least one sensor may include: estimating a driving path based on vehicle information; measuring a distance between the vehicle and an obstacle in the estimated driving path; and determining whether the vehicle will potentially collide with the obstacle based on the estimated driving path and the measured distance.

The estimating of the driving path may include estimating the driving path based on a steering angle of the vehicle and a yaw rate of the vehicle which are acquired by the at least one sensor.

The measuring of the distance may include measuring the distance between the vehicle and the obstacle using a camera and an ultrasonic sensor.

The determining of whether the vehicle is driven using the at least one sensor may include: measuring a position of a pedestrian in a driving path of the vehicle; and determining whether the pedestrian will potentially collide with the vehicle based on the measured position.

The measuring of the position of the pedestrian may include measuring the position of the pedestrian using an ultrasonic sensor and a camera.

Furthermore, according to another embodiments of the present disclosure, a driver assistance apparatus includes: a sensor module including at least two different sensors which sense images around a vehicle, a distance between the vehicle and an obstacle, and vehicle state information; a steering control apparatus configured to control steering of the vehicle; a braking control apparatus configured to control braking of the vehicle; and a controller configured to determine a driving mode based on data measured by the sensor module, to determine whether the vehicle is driven using at least one sensor based on the determined driving mode, and to control steering and braking of the vehicle based on whether the vehicle is driven using the at least on sensor.

The sensor module may include a camera, a radar, an ultrasonic sensor, and a vehicle sensor.

The controller may be further configured to determine the driving mode based on a vehicle speed, a pedestrian density, and surrounding environment information using the sensor module.

The driving mode may be a minor accident prevention mode or a pedestrian protection mode.

The controller may be further configured to estimate a driving path of the vehicle based on vehicle information acquired by the sensor module, when the driving mode is the minor accident prevention mode.

The controller may be further configured to measure a distance between the vehicle and an obstacle in the driving path using the camera and the ultrasonic sensor and to determine whether the vehicle will potentially collide with the obstacle.

The controller may be further configured to measure a position of a pedestrian in a driving path of the vehicle using the camera and the ultrasonic sensor and to determine whether the pedestrian will potentially collide with the vehicle, when the driving mode is the pedestrian protection mode.

The driver assistance apparatus may further include a button configured to adjust the driving mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
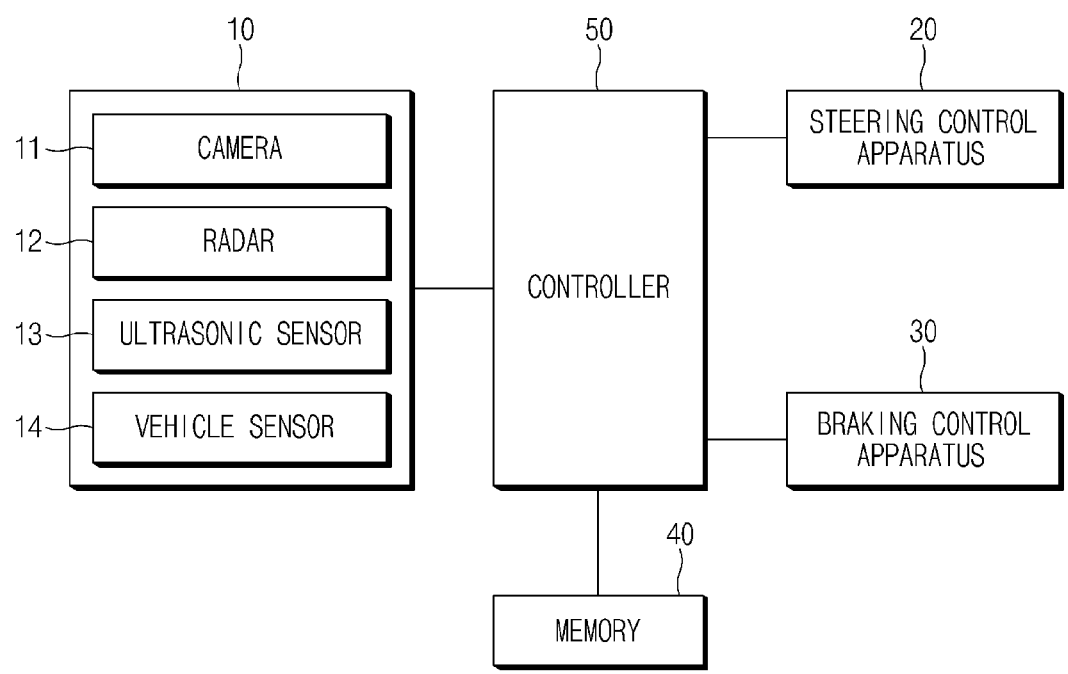
FIG. 1 is a block diagram illustrating a configuration of a driver assistance apparatus according to embodiments of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

Throughout the present specification, unless explicitly described to the contrary, "comprising" any components will be understood to imply the inclusion of other elements rather than the exclusion of any other elements. Further, the term "part", "-er, -or", "module", or the like, described in the specification means a unit of processing at least one function or operation and may be implemented by hardware or software or a combination of hardware and software. Further, unless mentioned in the present specification otherwise or clearly refuted by a context in a context describing the present disclosure, an article such as "a, an", "one", "the", or the like may be used as a meaning including both of a singular number and a plural number.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the disclosed embodiments, FIG. 1 is a block diagram illustrating a configuration of a driver assistance apparatus according to embodiments of the present disclosure.

As shown in FIG. 1, a driver assistance apparatus according to embodiments of the present disclosure includes a sensor module 10, a steering control apparatus 20, a braking control apparatus 30, a memory 40, and a controller 50.

The sensor module 10 is configured to include at least two different sensors which are equipped in a vehicle. The sensor module 10 includes a camera 11, a radar 12, an ultrasonic sensor 13, and a vehicle sensor 14. The sensor module 10 may further include a sensor such as a LiDAR in addition to the above sensors.

The camera 11 is equipped at any one of a front, a rear, and sides of a vehicle to photograph images around the vehicle. The camera 11 may be implemented as an omni-directional camera, a charge-coupled device (CCD) camera, a complementary metal-oxide semiconductor (CMOS) camera. The camera 11 may include an image processor which performs image processing, such as noise removal, color reproduction, image quality and chroma control, and file compression, on images acquired by the image sensor.

The radar 12 measures a distance between the vehicle and front objects (e.g., vehicle, pedestrian, and the like).

The ultrasonic sensor 13 measures a distance between the vehicle and objects near the vehicle. The vehicle sensor 14 is a sensor which is equipped in the vehicle and includes a steering angle sensor, a yaw rate sensor, a vehicle speed sensor, and the like. The vehicle sensor 14 senses vehicle information using the sensors which are equipped in the vehicle.

The steering control apparatus 20 controls the steering angle to steer a vehicle wheel.

The braking control apparatus 30 controls a braking torque to control a braking force of the vehicle wheel.

The memory 40 may store programs for executing the controller 50 and may temporarily store data measured by the sensor module 10. Further, the memory 40 stores programs for executing a driver assistance function and stores general information such as a vehicle width.

The controller 50 determines a driving mode based on data measured by the camera 11, the radar 12, and the vehicle sensor 14 of the sensor module 10. In other words, the controller 50 determines the driving mode in consideration of a vehicle speed, pedestrian density (e.g., the number/distance of pedestrians), surrounding environment information (e.g., outer wall, guard rail, vehicle, and the like), and a vehicle speed. Here, the driving mode is classified into a minor accident prevention mode, and a pedestrian protection mode.

Embodiments disclosed herein describe determining the driving mode based on the data measured by the sensors but is not limited thereto and therefore may also be implemented to input the driving mode by operating buttons which are separately installed. For example, the driver assistance apparatus may include a minor accident prevention mode button and a pedestrian protection mode button. As such, a driver who is good at driving a vehicle or is poor at driving a vehicle may operate the buttons to select the driving mode, thereby improving sensor reliability while preventing the driving mode from being frequently operated as the minor accident prevention mode or the pedestrian protection mode.

When the driving mode is determined, the controller 50 determines whether the vehicle is driven while using a combination of the sensors of the sensor module 10 depending on the determined driving mode. The controller 50 determines whether a vehicle is driven in the driving direction by the camera 11, the radar 12, and the ultrasonic sensor 13. The controller 50 estimates (i.e., predicts) the driving path of the vehicle based on the vehicle information (e.g., state information) acquired by the vehicle sensor 14 when the driving mode is the minor accident prevention mode. Here, the vehicle information includes the steering angle and the yaw rate. Further, the controller 50 measures the distance between the vehicle and the front and left and right obstacles (e.g., objects) by the camera 11, the radar 12, and the ultrasonic sensor 13 to determine whether the vehicle passes through the obstacles.

Meanwhile, the controller 50 measures the position of the pedestrian on the vehicle driving path based on the information acquired by the camera 11 and the ultrasonic sensor 13 when the driving mode is the pedestrian protection mode to determine whether there is a collision possibility between the vehicle and the pedestrian (i.e., whether the vehicle will potentially collide with the pedestrian). The controller 50 generates the driver assistance information (e.g., steering angle, braking torque, and the like) which may control at least one of the steering and braking depending on whether the vehicle is driven and transmits the generated driver assistance information to the steering control apparatus 20 and the braking control apparatus 30. The steering control apparatus 20 and the braking control apparatus 30 control the steering and braking of the vehicle depending on the driving assistance information. That is, the controller 50 controls a vehicle to be driven while avoiding a collision with the proximity distance obstacle and the pedestrian.

Figure 2:
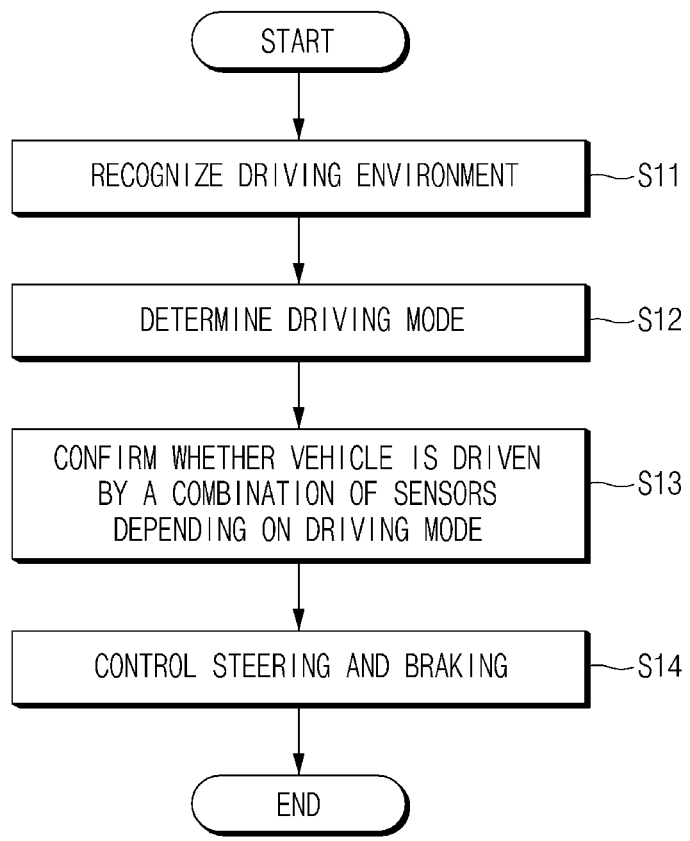
FIG. 2 is a flow chart illustrating a method for operating a driver assistance apparatus according to embodiments of the present disclosure.
Figure 3A:
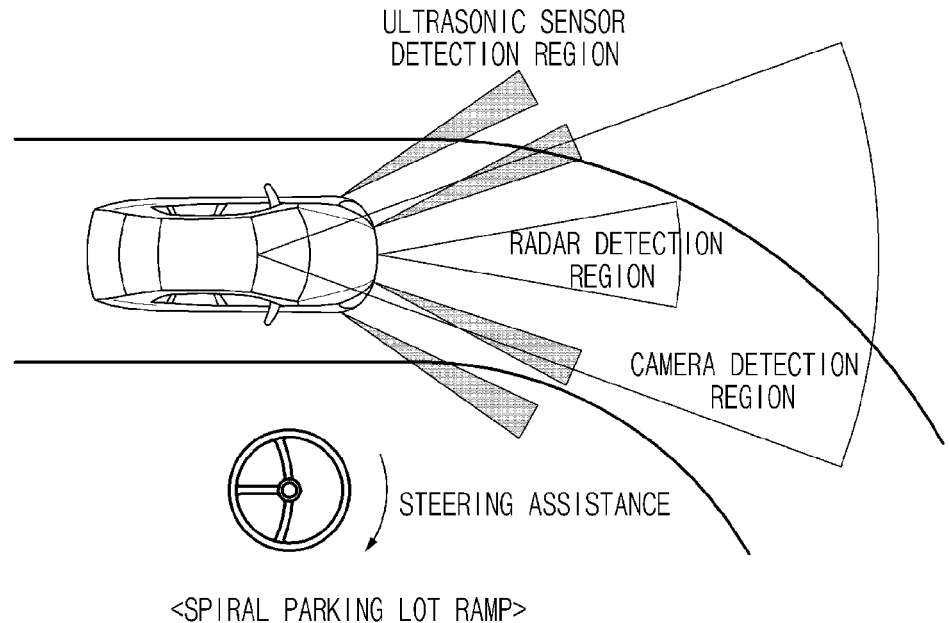
FIGS. 3A and 3B are diagrams illustrating a sensor detection region for each situation associated with the present disclosure.
Figure 3A:
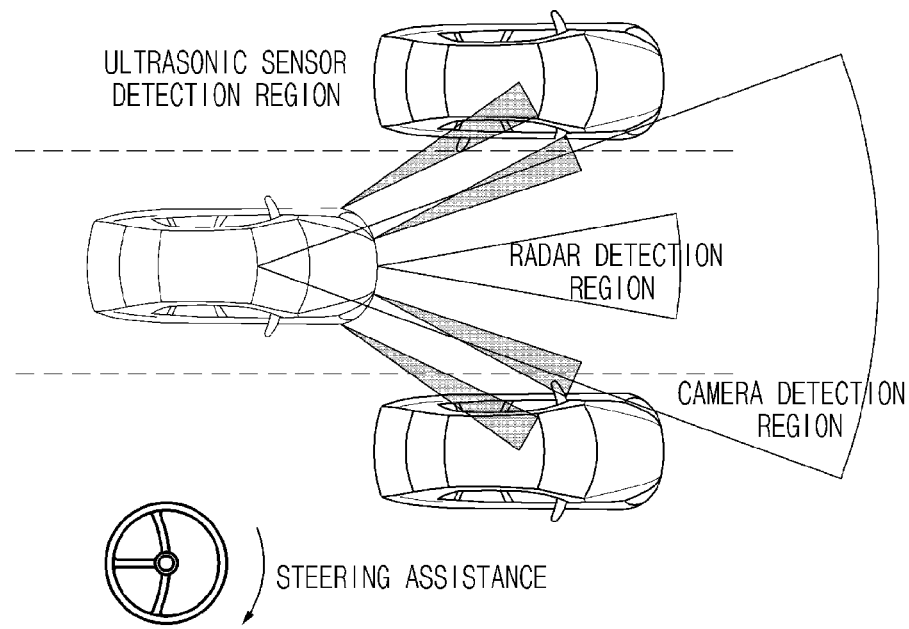
Figure 3B:
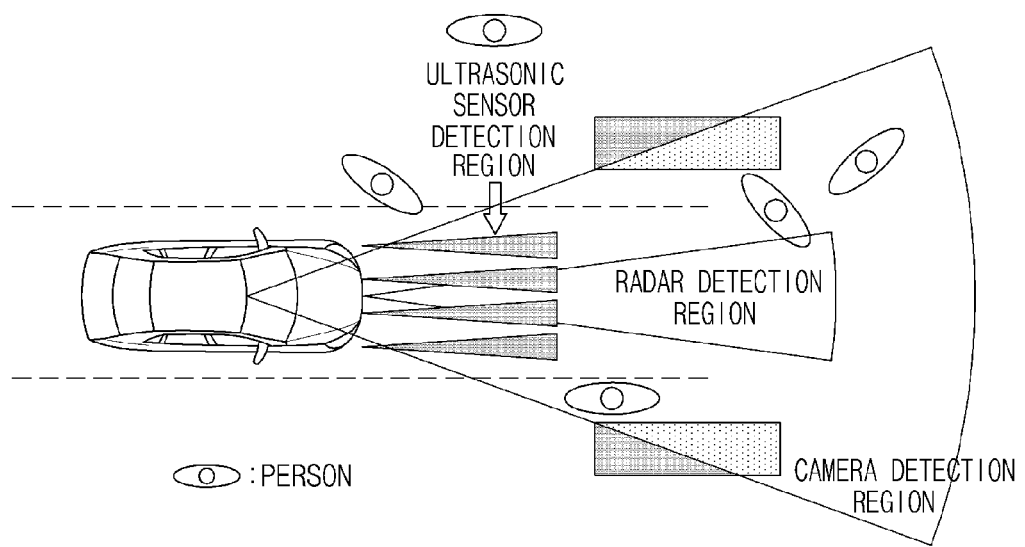

FIG. 2 is a flow chart illustrating a method for operating a driver assistance apparatus according to embodiments of the present disclosure, and FIGS. 3A and 3B are diagrams illustrating a sensor detection region for each situation associated with the present disclosure.

The controller 50 recognizes driving environment of the vehicle using the sensor module 10 (S11). The controller 50 determines the vehicle speed using the vehicle sensor 14 and recognizes the pedestrian density and the surrounding environment (e.g., outer wall, guard rail, vehicle, and the like) using the camera 11 and the radar 12. The controller 50 recognizes the vehicle as entering the low speed section when the vehicle speed measured by the vehicle sensor 14 is driven at a reference speed (e.g., 30 km/h) or less for a predetermined time (e.g., 1 minute). The low-speed section means areas where a minor accident is highly likely to occur, such as a parking lot ramp, a narrow road, and an alley. Further, the controller 50 determines whether there are sections in which pedestrians are crowded, such as a pedestrian crossing on a vehicle driving path, a market, and a public road of sidewalk/roadway.

The controller 50 determines the driving mode depending on the recognized driving environment (S12). The controller 50 determines the driving mode as the minor accident prevention mode while the vehicle enters the low-speed section. Meanwhile, the controller 50 determines the driving mode as the pedestrian protection mode while the vehicle is entered from then low speed section into a densely populated district.

Additionally, the controller 50 determines the driving mode as the minor accident prevention mode or the pedestrian protection mode in consideration of the vehicle speed, the pedestrian density, and the surrounding environment information. The controller 50 also determines whether the vehicle is driven by combining at least one sensor of the sensor module 10 depending on the determined driving mode (S13). Moreover, the controller 50 measures the distance between the vehicle and the front obstacles based on the camera 11, the radar 12, and the ultrasonic sensor 13 when the driving mode is the minor accident prevention mode and measures the vehicle information such as the steering angle and the yaw rate using the vehicle sensor 14.

Meanwhile, the controller 50 determines the position of the pedestrian near the vehicle on the driving path using the camera 11 and the ultrasonic sensor 13 when the driving mode is the pedestrian protection mode and determines the collision possibility with the pedestrian. The controller 50 also controls the steering and braking of the vehicle depending on whether the vehicle is driven (S14). Additionally, the controller 50 controls the steering control apparatus 20 and the braking control apparatus 30 to control the steering and/or braking of the vehicle, thereby performing the avoidance driving.

For example, as illustrated in FIG. 3A, the controller detects (i.e., senses) the front and left and right proximity distance obstacles using the camera 11 and the ultrasonic sensor 13 when the vehicle drives the spiral parking lot ramp or the narrow road. As such, the obstacles can be sensed using the ultrasonic sensor 13, and thus the left and right steering and the braking may be controlled accordingly to avoid the potential collision with the corresponding obstacles.

Further, as illustrated in FIG. 3B, when the pedestrians are crowded in the front of the vehicle, the controller 50 uses the camera 11 and the ultrasonic sensor 13 to sense the pedestrian near the vehicle driving path and determine whether there is the collision possibility with the sensed pedestrian. Further, when there is the collision possibility with the sensed pedestrian, the controller 50 controls the left and right steering and the braking to avoid the collision.

Figure 4:
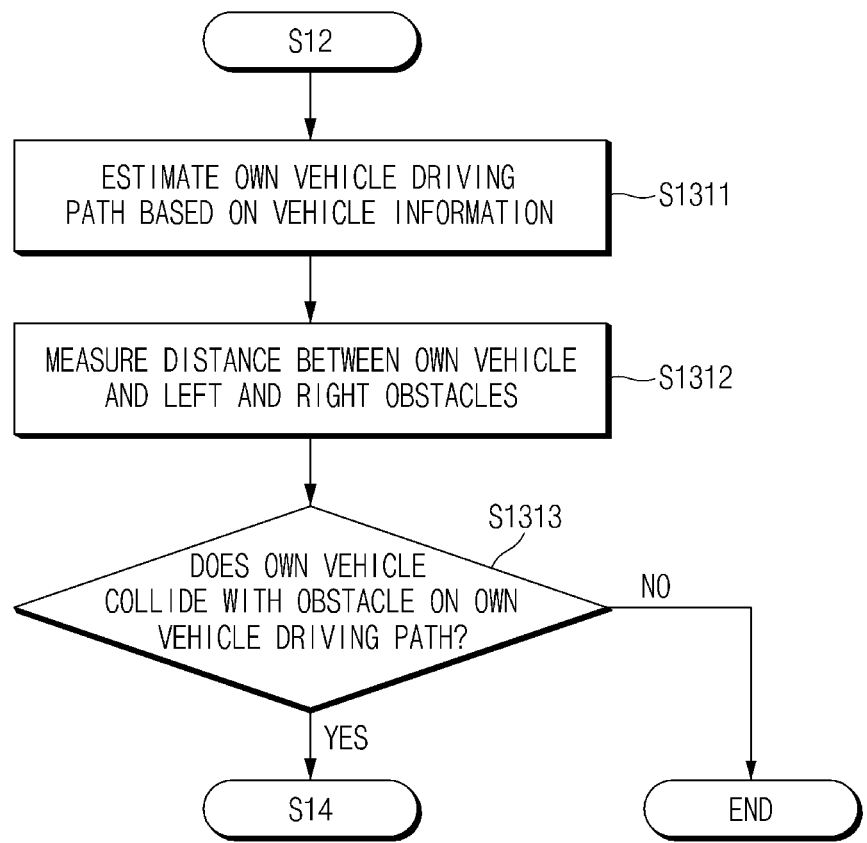
FIG. 4 is a flow chart illustrating a process of determining whether a vehicle is driven depending on a driving mode according to embodiments of the present disclosure.

FIG. 4 is a flow chart illustrating a process of determining whether a vehicle is driven depending on a driving mode according to embodiments of the present disclosure.

The controller 50 estimates the driving path of the vehicle based on the vehicle information (S1311). The controller 50 uses the steering angle and the yaw rate of the vehicle acquired by the vehicle sensor 14 to estimate the vehicle driving path.

The controller 50 measures the distance between the vehicle and the front and left and right obstacles (S1312). In this case, the controller 50 additionally drives the ultrasonic sensor 13 to measure the distance from the front obstacles and the left and right obstacles which are positioned at a proximity distance from the own vehicle.

In addition, the controller 50 determines whether there is the collision possibility with the obstacles on the driving path based on the own vehicle driving path and the distance from the obstacles (S1313). For example, when the vehicles are positioned at the left and right of the driving road, respectively, the controller 50 determines whether there is the collision possibility with two vehicles. Further, the controller 50 generates the driver assistance information if it is conformed that there is the collision possibility to control the steering control apparatus 20 and the braking control apparatus 30. Therefore, the own vehicle may pass without colliding with the vehicles which are each positioned at the left and right on the own vehicle driving direction by the steering and braking control.

Figure 5:
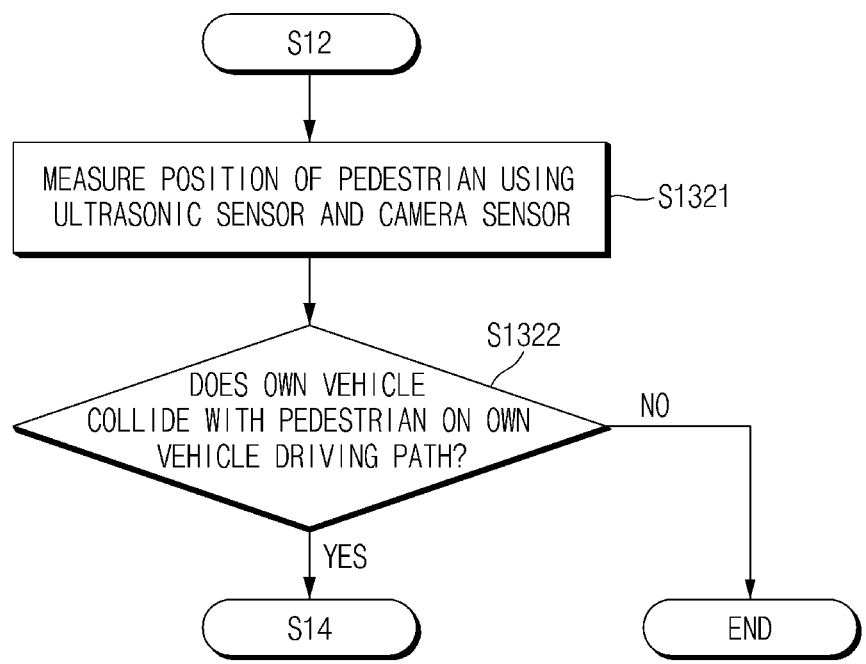
FIG. 5 is a flow chart illustrating a process of determining whether a vehicle is driven depending on a driving mode according to embodiments of the present disclosure.

FIG. 5 is a flow chart illustrating a process of determining whether a vehicle is driven depending on a driving mode according to embodiments of the present disclosure.

The controller 50 measures the position of the pedestrian which is present on the vehicle driving path (S1321).

The controller 50 determines whether there is the collision possibility of the own vehicle with the pedestrian (S1322). In this case, the controller 50 uses the camera 11 and the ultrasonic sensor 13 to measure the position of the pedestrian which is positioned at the proximity distance on the vehicle driving path. Further, the controller 50 determines whether there is the collision possibility of the own vehicle with the corresponding pedestrian.

As described above, according to embodiments of the present disclosure, it is possible to reduce social costs due to a minor accident with proximity distance obstacles by controlling the steering and braking of the vehicle using a combination of sensors, especially in the low-speed sections such as a spiral parking lot ramp, a narrow road, an alley, and the like. Further, it is possible to prevent accidents involving pedestrians by controlling the steering and braking of the vehicle based on the determination of whether there is the collision possibility with pedestrians on the driving path (i.e., driving direction), especially in a densely populated district using a combination of sensors already equipped in the vehicle. Further, the present disclosure may be expanded from the collision avoidance on the existing general road and in the high-speed region to all driving regions.

The above-mentioned embodiments are implemented by combining the components and the features of the present disclosure in a predetermined form. Each component or feature should be considered as being selective unless being explicitly described separately. Each component or feature may be practiced in a form in which it is not combined with other components or features. Further, the embodiments of the present disclosure may be configured by combining some components and/or features. An order of the operations described in the embodiments of the present disclosure may be changed. Some components or features of any of the embodiments may be included in other embodiments or may be replaced by the corresponding components or features of other embodiments. It is apparent that the embodiments may be configured by combining claims which do not have an explicitly cited relation in claims or may be included in new claims which are amended after filing.

The embodiments of the present disclosure may be implemented by various means, for example, hardware, firmware, software, or a combination thereof, or the like. In the case of the implementation by the hardware, the embodiments of the present disclosure may be implemented by application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case of the implementation by firmware or the software, the embodiments of the present disclosure may be implemented by a form of modules, procedures, functions, or the like, that perform functions or operations described above. Software codes are stored in a memory unit and may be driven by a processor. The memory unit is disposed inside or outside the processor and may transmit and receive data to and from the processor by the well-known various means.

It is apparent to those skilled in the art that the embodiments of the present disclosure may be embodied in other specific forms without departing from features of the present disclosure. Therefore, the foregoing detailed description is not to be restrictively construed in all aspects but should be reckoned as being exemplary. The scope of the present disclosure is to be determined by a reasonable interpretation of the appending claims and all the changes within an equivalent range of the present disclosure are included in the scope of the present disclosure.

What is claimed is:

1. A method for operating a driver assistance apparatus, comprising the steps of:

recognizing a driving environment of a vehicle by using a sensor module including at least two different sensors, wherein the step of recognizing the driving environment includes recognizing the vehicle as entering a low-speed section when a vehicle speed measured by a vehicle sensor is a reference speed or less for a predetermined time;

determining a driving mode based on the driving environment when the vehicle enters the low-speed section, wherein the driving mode is determined to be one of a minor accident prevention mode or a pedestrian protection mode;

determining, based on the driving mode, whether a collision is possible using at least one sensor of the sensor module; and controlling, using the at least one sensor, at least one of steering and braking of the vehicle based on whether the collision is possible, wherein the step of determining whether the collision is possible using the at least one sensor comprises:

estimating a driving path of the vehicle based on vehicle information acquired by the vehicle sensor, when the driving mode is the minor accident prevention mode, and measuring a position of a pedestrian in a driving path of the vehicle using at least one of a camera, radar, and an ultrasonic sensor, and determining whether the pedestrian will potentially collide with the vehicle, when the driving mode is the pedestrian protection mode.

2. The method according to claim 1, wherein the step of determining the driving mode comprises determining the driving mode based on a vehicle speed, a pedestrian density, and at least one of an outer wall, a guard rail, and another vehicle.

3. The method according to claim 1, wherein the step of determining whether the collision is possible using the at least one sensor comprises the steps of:
measuring a distance between the vehicle and an obstacle in the estimated driving path, when the driving mode is the minor accident prevention mode; and
determining whether the vehicle will potentially collide with the obstacle based on the estimated driving path and the measured distance.

4. The method according to claim 3, wherein the step of measuring the distance comprises measuring the distance between the vehicle and the obstacle using at least one of the camera, the radar, and the ultrasonic sensor.

5. The method according to claim 1, wherein the step of estimating the driving path comprises estimating the driving path based on a steering angle of the vehicle and a yaw rate of the vehicle which are acquired by the at least one sensor.

6. A driver assistance apparatus, comprising:
a sensor module including at least two different sensors; and
a controller configured to recognize the vehicle as entering a low-speed section when a vehicle speed measured by a vehicle sensor is a reference speed or less for a predetermined time, to determine a driving mode based on data measured by the sensor module when the vehicle enters the low-speed section, to determine, based on the driving mode, whether a collision is possible using at least one sensor of the sensor module, and to control, using the at least one sensor of the sensor module, at least one of steering and braking of the vehicle based on whether the collision is possible,
wherein the driving mode is determined to be one of a minor accident prevention mode or a pedestrian protection mode,
wherein the controller is further configured to:
estimate a driving path of the vehicle based on vehicle information acquired by the vehicle sensor, when the driving mode is the minor accident prevention mode, and
measure a position of a pedestrian in a driving path of the vehicle using at least one of a camera, radar, and an ultrasonic sensor, and determine whether the pedestrian will potentially collide with the vehicle, when the driving mode is the pedestrian protection mode.

7. The driver assistance apparatus according to claim 6, wherein the sensor module includes the camera, the radar, the ultrasonic sensor, and the vehicle sensor.

8. The driver assistance apparatus according to claim 7, wherein the controller is further configured to determine the driving mode based on a vehicle speed, a pedestrian density, and at least one of an outer wall, a guard rail, and another vehicle using the sensor module.

9. The driver assistance apparatus according to claim 6, wherein the controller is further configured to measure a distance between the vehicle and an obstacle in the driving path using at least one of the camera, the radar, and the ultrasonic sensor and to determine whether the vehicle will potentially collide with the obstacle, when the driving mode is the minor accident prevention mode.

10. The driver assistance apparatus according to claim 6, further comprising a button configured to adjust the driving mode.

\* \* \* \* \*